FIG. 2

United States Patent Office 3,808,271
Patented Apr. 30, 1974

3,808,271
UREA SYNTHESIS
Ivo Mavrovic, 530 E. 72nd St.,
New York, N.Y. 10021
Original application June 29, 1970, Ser. No. 50,777.
Divided and this application Feb. 4, 1972, Ser.
No. 223,511
The portion of the term of the patent subsequent to
May 18, 1988, has been disclaimed
Int. Cl. C07c 127/00
U.S. Cl. 260—555 A                    6 Claims

ABSTRACT OF THE DISCLOSURE

Ammonia, $CO_2$ and ammonium carbamate are reacted in a reactor at elevated temperature and pressure to form urea. From 10 to 100 percent of the $CO_2$ fresh reactor feed stream, which is substantially equivalent to the stoichiometric net amount of urea formed in the reactor, is reacted with $NH_3$ at 10–670 p.s.i.a. to form an aqueous ammonium carbamate solution, and this solution is charged to the reactor to form urea.

RELATED APPLICATION

This application is a division of application Ser. No. 50,777, filed June 29, 1970.

FIELD OF INVENTION

This application has to do with the synthesis of urea from ammonia and carbon dioxide.

BACKGROUND OF INVENTION

Urea is commercially obtained by reacting $NH_3$ and $CO_2$ in a reactor at elevated temperature and pressure. At urea synthesis conditions $NH_3$ and $CO_2$ instantaneously and completely react stoichiometrically to form ammonium carbamate. The latter is partially converted to urea and water within 20–30 minutes of residence time in the reactor. Excess $NH_3$ above this stoichiometric ratio is used in the reactor, in an usual $NH_3$ to $CO_2$ overall mole ratio from 3/1 to 6/1, for the purpose of increasing the conversion of carbamate to urea. The urea synthesis reactor effluent containing urea, water, excess free $NH_3$ and unconverted ammonium carbamate is usually let down in pressure and heated usually at about 200–300 p.s.i.g., for the purpose of decomposing the unconverted ammonium carbamate to $NH_3$ and $CO_2$ and of expelling from the urea product solution the $NH_3$ and the $CO_2$ liberated from the solution. The $NH_3$ and $CO_2$ gas with water vapor thus recovered, are absorbed in water to form an aqueous ammoniacal solution of ammonium carbamate and are recycled back into the urea reactor for total recovery.

Another prior process uses the technique of contacting at high temperature the reactor effluent with the gaseous $CO_2$ reactor feed stream for the purpose of stripping the unconverted carbamate from the urea product solution. This stripping is done at reactor pressure, and the gas thus obtained is condensed and recycled by gravity to the reactor for recovery. In such process, however, the overall $NH_3$ to $CO_2$ molar ratio in the reactor must be maintained relatively low, in the range of 2.0–2.5/1, due to the fact that a larger amount of excess $NH_3$ would hinder the subsequent carbamate stripping with $CO_2$ gas. As a consequence, the formation of undesirable biuret in the stripper is drastically promoted, and the rate of corrosion of the metallic parts of the equipment in contact with such urea product, depleted of its beneficial excess $NH_3$, is highly increased. This process also has an economical disadvantage because of the relatively low conversion of carbamate to urea, which is due to the relatively lower $NH_3$ to $CO_2$ overall mol ratio in the reactor.

In this respect, urea synthesis processes using a relatively larger amount of excess ammonia in the reactor have a definite advantage over the $CO_2$ stripping processes utilizing a relatively lower $NH_3$ to $CO_2$ molar ratio in the reactor. But, due to the fact that the amount of excess free ammonia present in the reactor is usually maintained in such urea processes at a rather high level for the purpose of increasing the conversion of carbamate to urea, the $NH_3$ and $CO_2$ gas recovered from a subsequent lower pressure decomposition stage of carbamate usually contains a large excess of ammonia above the stoichiometric ratio of 2:1. This large excess of ammonia can not be totally absorbed in the aqueous solution of carbamate recovered in the condenser, but it is usually separated from the carbamate solution as pure, gaseous, excess $NH_3$ by means of one of the well-known methods in the art. The excess gaseous $NH_3$ is condensed to liquid and is recycled to the reactor. This usual system involves quite a high number of pieces of equipment and its relatively high investment cost is obvious.

Furthermore, the presence of this relatively large amount of excess ammonia contained in the gaseous phase in equilibrium with the aqueous urea product solution, from which the unconverted carbamate is decomposed, is the cause of a relatively high concentration of residual $NH_3$, dissolved in the urea product solution, due to the relatively high partial pressure of $NH_3$ in such gaseous phase.

As a general practical rule, the higher the $NH_3$ to $CO_2$ mol ratio used in the urea synthesis reactor, the higher the concentration of residual excess $NH_3$ in the urea product solution. A typical urea product solution obtained from a plant using such a high excess ammonia urea synthesis process, contains up to 1.5 wt. percent of residual ammonia. This residual amount of $NH_3$ contained in such a urea product solution is usually lost either as a gaseous or as a liquid effluent waste during the subsequent step of processing the urea product solution to solid urea by evaporation or by crystallization. Various methods of $NH_3$ recovery from such gaseous or liquid effluent wastes have been suggested in the past, but most of these suggested methods are either impractical or uneconomical because of the relatively high dilution of the effluent wastes.

It is an object of this invention to provide a total recycle urea synthesis process, using a relatively high excess $NH_3$ in the reactor, with a highly improved degree of $NH_3$ recovery from the aqueous urea product solution.

A further object of this invention is to provide a total recycle urea synthesis process with an improved method of recovering the excess $NH_3$ from the reactor effluent and of recycling it to the urea synthesis reactor. An additional object of this invention is to provide an improved total recycle urea synthesis process in which gaseous $CO_2$ is added to each condensing stage for the purpose of lowering the vapor pressure of the aqueous ammoniacal solution of ammonium carbamate formed from the condensation of the gas recovered from the decomposition of carbamate originally present in the urea synthesis reactor effluent.

Still another object of this invention is to provide a total recycle urea synthesis process with an improved method of heat recovery.

These and other objects and advantages of the present invention will become evident from the description which follows.

FIG. 2 shows a flow diagram revealing a technique for recovering excess $NH_3$ from an urea synthesis reactor effluent stream and for recycling it to the reactor.

Figure 2:
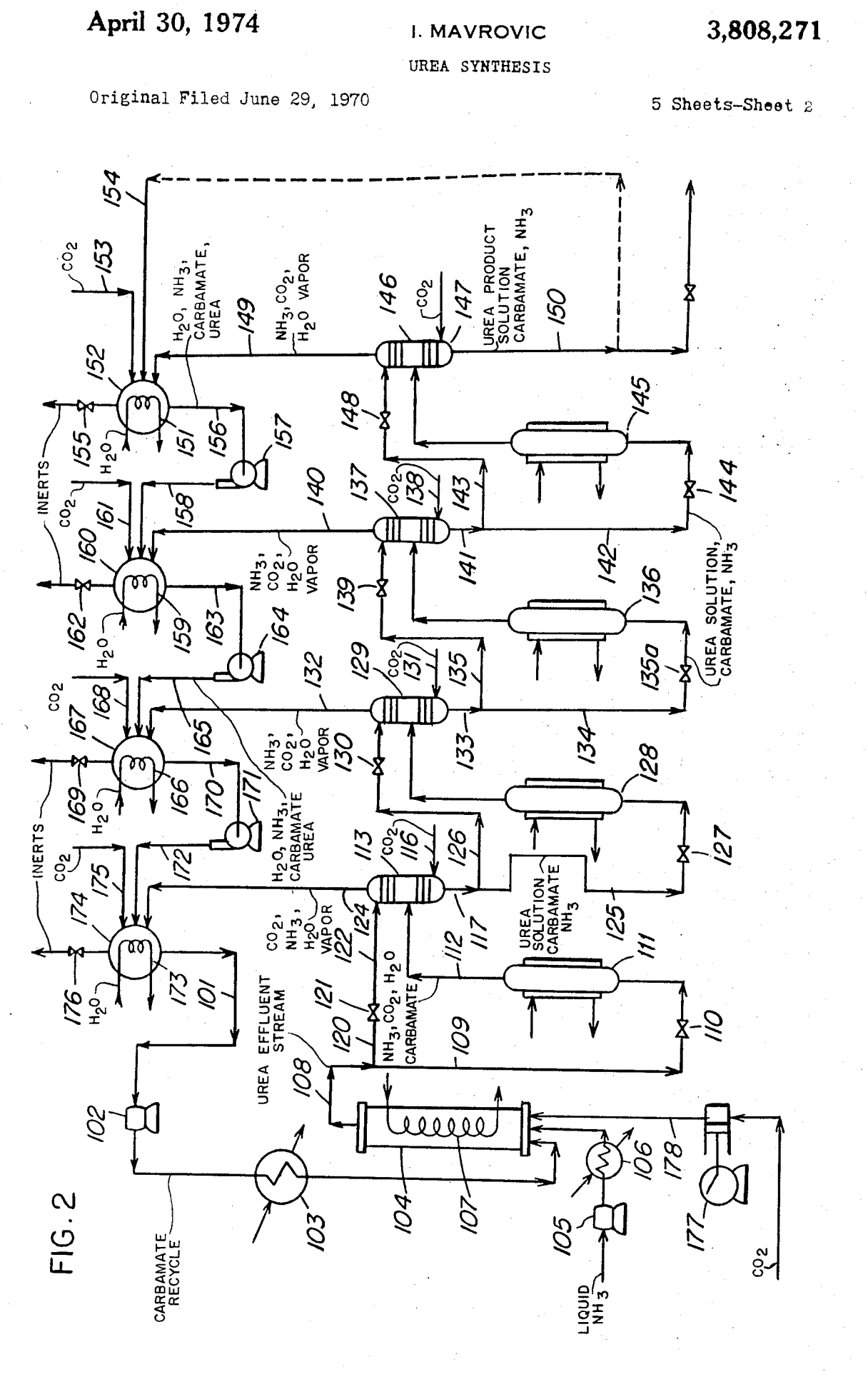
Figure 3:
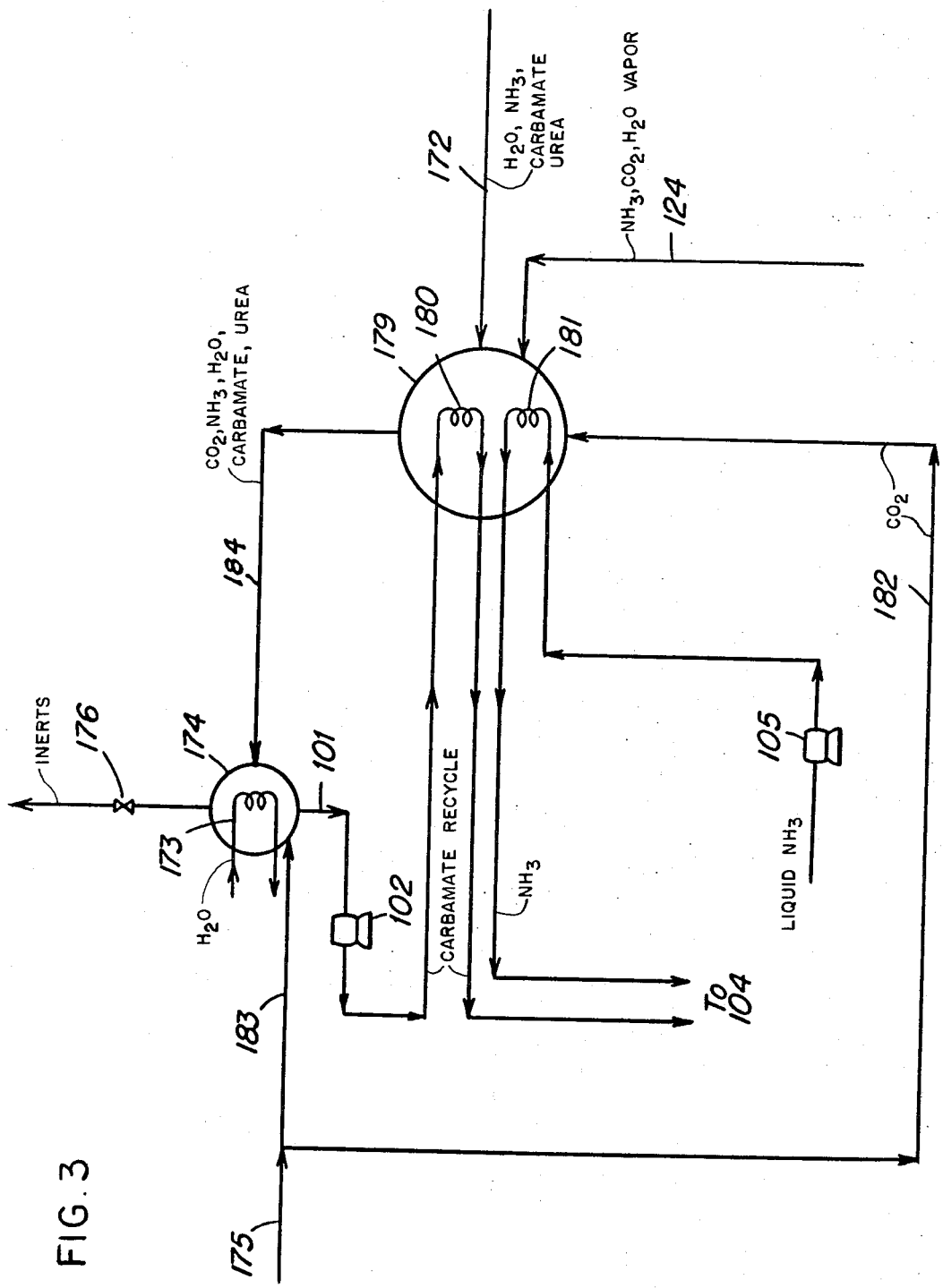
Figure 4:
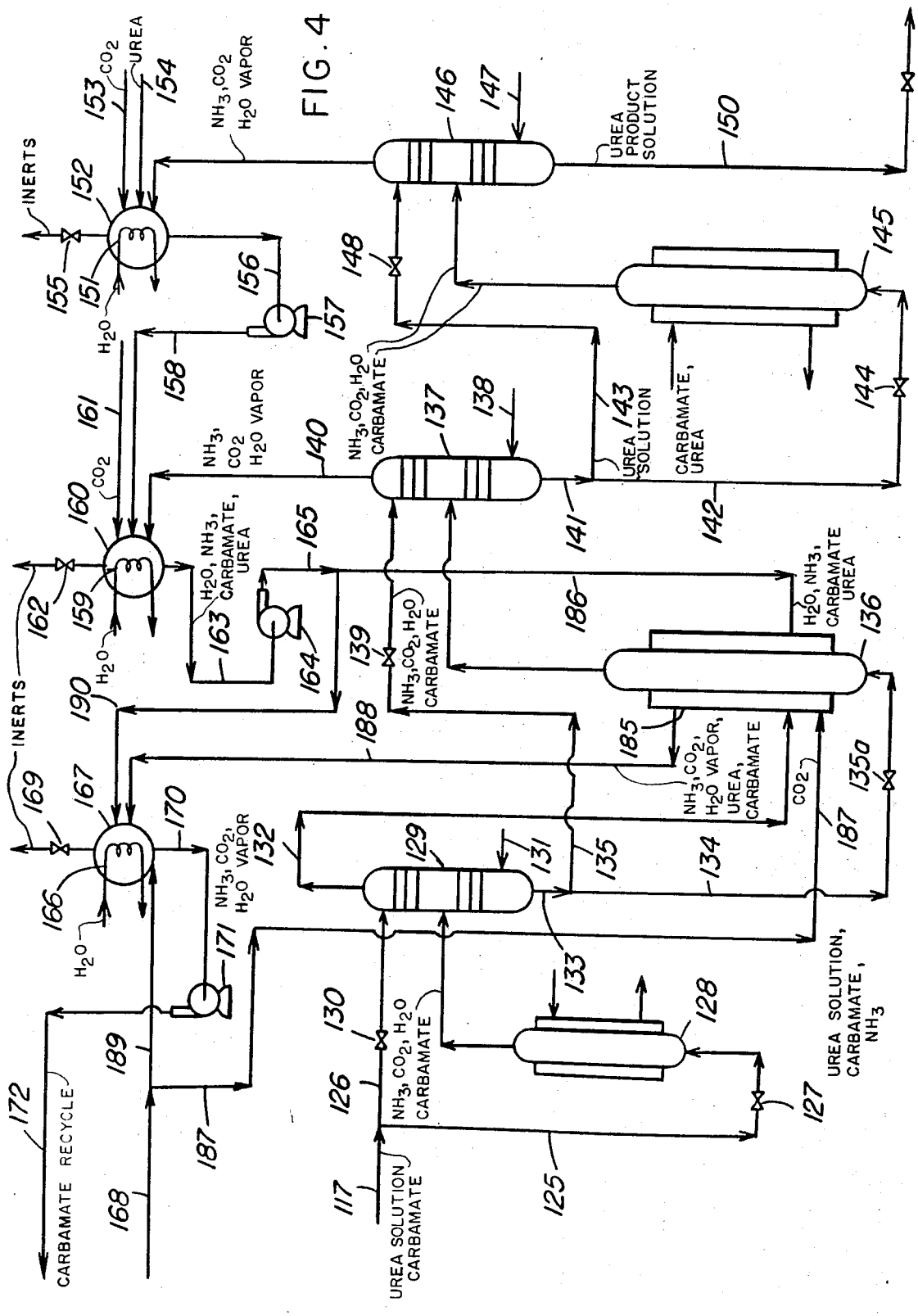
Figure 5:
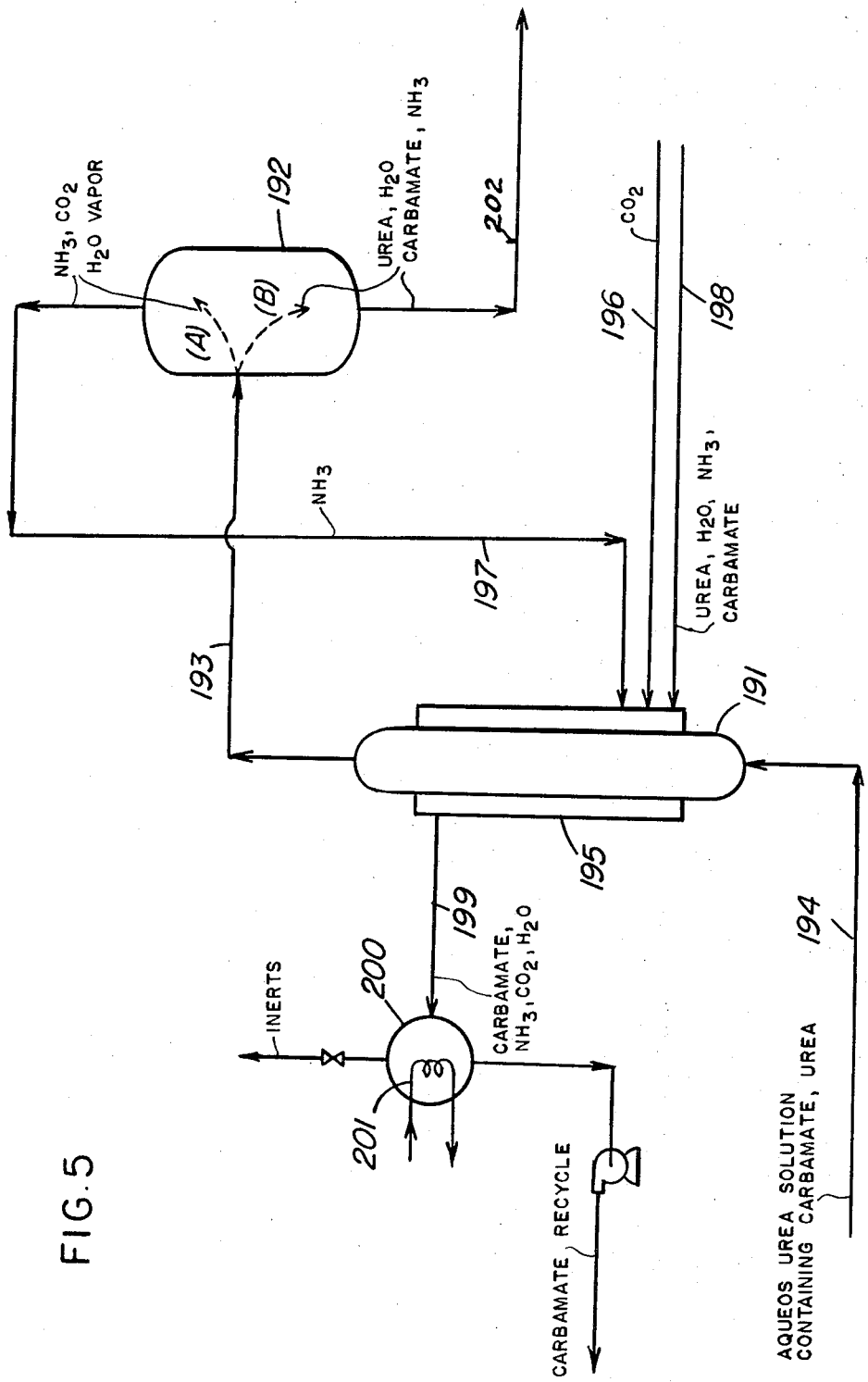

FIGS. 3, 4 and 5 constitute abbreviated flow diagrams of processing schemes which can be used with the process shown by FIG. 2, to effect various economics in heat demand.

SUMMARY OF THE INVENTION

In accordance with the present invention, there is provided a process for forming urea by reaction of ammonia and carbon dioxide.

A first aqueous urea solution containing ammonium carbamate and ammonia in an overall $NH_3$ to $CO_2$ molar ratio of from about 3 to about 15 molar proportions of $NH_3$ as ammonium carbamate and as dissolved $NH_3$ to one molar proportion of $CO_2$ as ammonium carbamate is employed. The first aqueous urea solution is split into a minor portion (A) and a minor portion (B) thereof, and the minor portion (A) is cooled. Said major portion (B) is heated in a carbamate decomposer at a temperature above the decomposition temperature of amomnium carbamate and at a pressure of from about 10 p.s.i.a. to about 670 p.s.i.a., to decompose the carbamate to $NH_3$ and $CO_2$ gases, to vaporize part of the excess $NH_3$ and part of the water present in said major portion (B), and to expel the resulting gaseous phase (C) from the residual liquid phase (D), phase (D) containing residual ammonium carbamate and $NH_3$ dissolved in a second aqueous urea solution. The gaseous phase (C) is contacted countercurrently with said cooled minor portion (A), the temperature of said contact being at or above the decomposition temperature of ammonium carbamate and at a pressure of from about 10 p.s.i.a. to about 670 p.s.i.a. The liquid phase (D) is then contacted countercurrently with gaseous $CO_2$ at a pressure of from about 10 p.s.i.a. to about 670 p.s.i.a., the amount of gaseous $CO_2$ being from about 0.002 to about 0.5 part by weight per part by weight of urea present in said first aqueous urea solution, the gaseous $CO_2$ stripping $NH_3$ from said liquid phase (D) and cooling said phase (D).

There is also provided a urea synthesis process wherein $NH_3$, $CO_2$ and ammonium carbamate are reacted in total amounts of from about 3 to about 6 molar proportions of total equivalent $NH_3$ per one molar proportion of total equivalent $CO_2$ to form urea in a reactor at elevated temperature and pressure. In this process, from about 10 to about 100 percent of the $CO_2$ fresh reactor feed stream, which is substantially equivalent to the stoichiometric net amount of urea formed in the reactor, is reacted with $NH_3$ at a pressure of from about 10 p.s.i.a. to about 670 p.s.i.a. to form an aqueous ammonium carbamate solution, and the latter solution is charged to the reactor to form urea.

There is also provided a process for reacting $NH_3$ with $CO_2$ to form ammonium carbamate. $CO_2$ is charged to a first mixture containing $H_2O$, $CO_2$ and $NH_3$, the amount of $NH_3$ in this first mixture being from about 3.5 to about 18 molar proportions per molar proportion of $CO_2$ therein. The amount of said $CO_2$ charged is such that a resulting second mixture contains from about 2.1 to about 3.6 molar proportions of $NH_3$ as ammonium carbamate and free $NH_3$ per molar proportion of $CO_2$ as ammonium carbamate and free $CO_2$ therein. Heat of reaction of ammonium carbamate formation is then removed from the second mixture.

SPECIFIC EMBODIMENTS OF THE INVENTION

Figure 1:
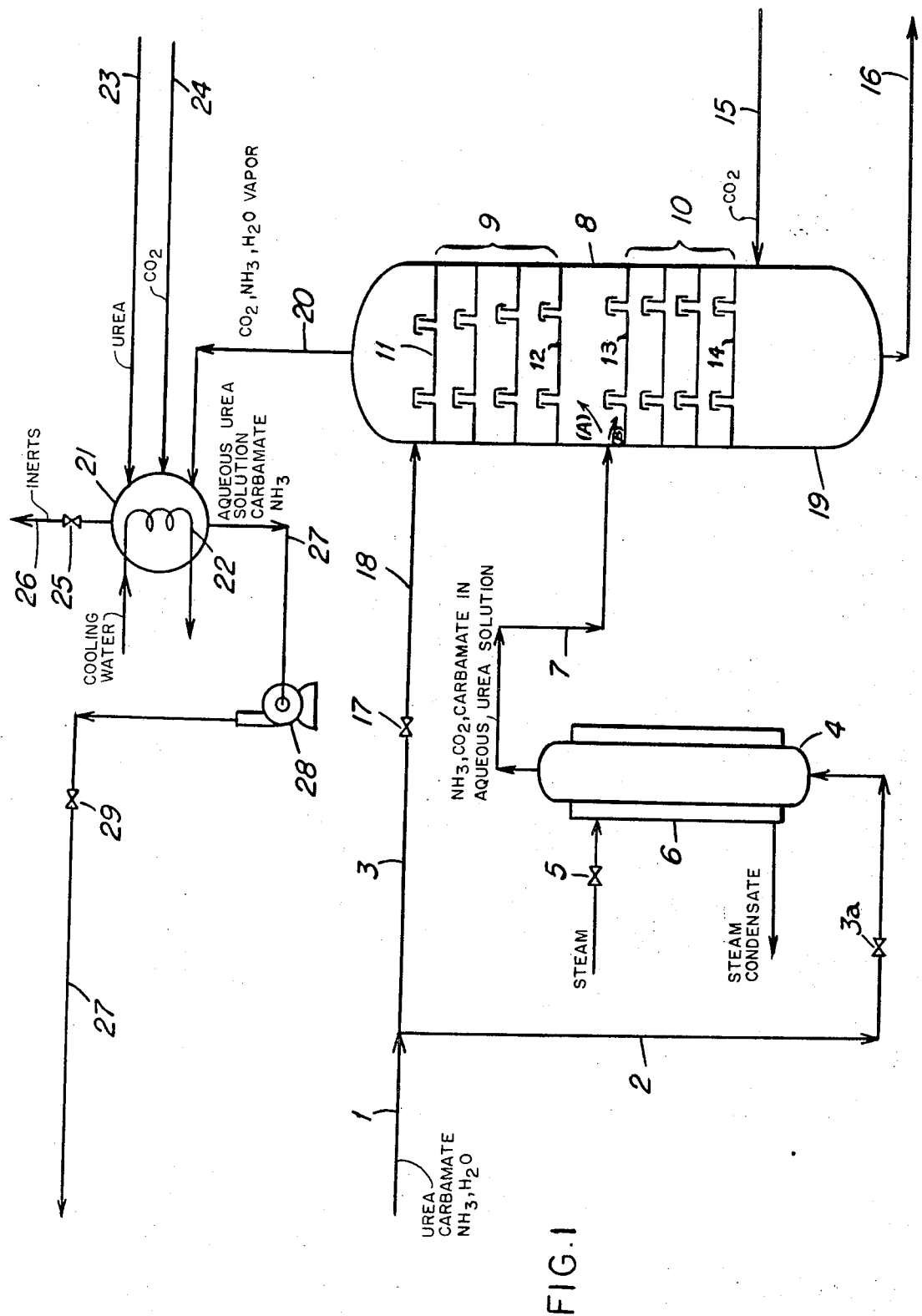
FIG. 1 illustrates the method by which the $NH_3$ recovery from the aqueous urea product solution and the lowering of the vapor pressure of the formed solution is attained.

According to FIG. 1, stream 1 is split into a major portion 2 and into a minor portion 3. Stream 1 can be either: an effluent stream from a urea synthesis reactor operating in the temperature range from 330° F. to 400° F. in a pressure range from 1500 p.s.i.g. to 4000 p.s.i.g., and with an $NH_3$ to $CO_2$ overall molar ratio between 3–6/1; or, an aqueous urea solution containing residual ammonium carbamate and excess ammonia withdrawn from a preceding carbamate decomposer or from a liquid-gas separator, in the temperature range of from about 190° F., to 340° F., in the pressure range of from about 10 p.s.i.a. to about 670 p.s.i.a. and in an $NH_3$ to $CO_2$ molar ratio of ammonia as carbamate and as dissolved $NH_3$ and of $CO_2$ as carbamate of from about 3 to about 15 moles of $NH_3$ per one mole of $CO_2$.

The major portion stream 2 is reduced in pressure through valve 3a and introduced into the bottom of the tube side of vertical carbamate decomposer 4. A heating medium, usually steam, is introduced through valve 5 and into the shell side 6 of decomposer 4. It will be obvious to those skilled in the art that other conventional decomposers can be used instead. Stream 2 is heated in decomposer 4 above the decomposition temperature of carbamate, in the temperature range of from about 190° F. to about 350° F. and in the pressure range of from about 10 p.s.i.a. to about 670 p.s.i.a., to decompose carbamate to $NH_3$ and $CO_2$ gas, to vaporize part of the excess ammonia and part of the water originally contained in stream 2, and to expel the gaseous phase (A) thus formed from the residual liquid phase (B) which comprises residual carbamate and ammonia dissolved in an aqueous urea solution.

The mixture of said gaseous phase (A) and liquid phase (B) is withdrawn from decomposer 4 through the exit line 7 and introduced into the midsection of gas-liquid separator 8, between the upper tray or packed section 9 and the lower tray or packed section 10 of separator 8.

Separator 8 can be operated in a pressure range of from about 10 p.s.i.a. to about 670 p.s.i.a.

Stream 7 is separated on the top tray 13 of the lower tray section 10 of separator 8 into its gaseous phase (A) rising through the upper tray section 9, and into its liquid phase (B), flowing downwardly through lower tray section 10 and countercurrently to an upwardly flowing stream of gaseous $CO_2$, introduced through line 15 into separator 8 below the bottom tray 14 of the lower tray section 10, at about the same temperature as tray 14.

The gaseous $CO_2$ is introduced through line 15 in an amount of from about 0.002 to about 0.5 lb. per lb. of urea present in stream 1. The gaseous $CO_2$ functions to strip part of the ammonia from the liquid phase (B) during its countercurrent contact in lower tray section 10. Since no heat from an external source is added to tray section 10 during the countercurrent contact, liquid phase (B) is adiabatically cooled from its original temperature at which it was in line 7, to the lower temperature at which the bottom tray 14 operates, because it supplies the equivalent amount of heat required to strip part of the ammonia present in liquid phase (B). This adiabatic drop in temperature of liquid phase (B) in tray section 10 is very advantageous because the detrimental formation of biuret as a byproduct from urea is retarded considerably. As an example, stream 16 leaving separator 8 contained only 0.15–0.20 wt. percent biuret on dry urea basis, compared with the equivalent effluent stream from a carbamate decomposer, running under similar pressure and temperature conditions but without addition of gaseous $CO_2$ for $NH_3$ stripping and urea product cooling, which contained about 0.4–0.5 wt. percent biuret on dry urea basis.

The top tray 13 of the lower tray section 10 of separator 8 can be operated in a temperature range which is analogous to the temperature range of stream 7 described above, more exactly the operating temperature of tray 13 is maintained very close to the operating temperature of stream 7.

The temperature of the bottom tray 14 of the lower tray section 10 in separator 8 is maintained at about 20–30° F. lower than the temperature of tray 13.

Going back to the gaseous phase (A) of stream 7, it was said before that this gaseous phase (A), separated from the liquid phase (B) of stream 7, enters the bottom tray 12 of the upper tray section 9 in separator 8 and it flows upwardly and countercurrently to the minor portion 3 of stream 1, which is reduced in pressure through valve 17, cooled to a temperature which is lower than stream 7, and is introduced through line 18 into separator 8 and fed onto the top tray 11 of the upper tray section 9 of separator 8. This minor portion 3 of stream 1 flows downwardly through tray section 9 and countercurrently to said gaseous phase (A), wherein it is heated by the uprising and relatively warmer gaseous phase (a). Due to this heating, part of the carbamate originally contained in stream 3 is decomposed to $NH_3$ and $CO_2$, part of the ammonia and water of stream 3 is vaporized, and the gaseous phase thus formed is expelled from stream 3 and its rises upwardly together with gaseous phase (A).

As a result, stream 3 in passing through separator 8 loses about 80% of its original content of carbamate by countercurrently contacting the upwardly flowing gaseous phase (A) due to the heating of stream 3 above the decomposition temperature of carbamate in the tray section 9; and gaseous phase (A) becomes richer in $CO_2$ by the equivalent amount of carbamate decomposed from stream 3.

The top tray 11 of the upper tray section 9 of separator 8 is operated at the temperature which is at or above the decomposition temperature of carbamate. For instance, in the operating pressure range between 10 p.s.i.a. and 670 p.s.i.a. within which the separator 8 can be operated, the temperature of the tray 11 is maintained at about 170° F. and about 290° F., respectively.

The bottom tray 12 of the upper tray section 9 of separator 8 is operated at about the same temperature as stream 7 entering separator 8, in the range of from about 190° F. to about 350° F., and its temperature is regulated by regulating the amount of stream 3 added to the separator 8.

Stream 3 is degassed in tray section 9, is mixed together with the liquid phase (B) of stream 7 on tray 13, the mixture of these two streams flows downwardly through tray section 10 and is collected in the bottom section 19 of separator 8, and is withdrawn from separator 8 through line 16.

The liquid stream 16, containing substantially all the urea originally contained in stream 1, and a residual part of the carbamate, ammonia and water originally contained in stream 1, can be further processed in one or several subsequent stages of carbamate decomposition-gas liquid separation of the type described in FIG. 1 or of some other type known in the art, to produce an aqueous urea solution product which contains only about 0.2 wt. percent of residual dissolved ammonia, compared to the 1.5 wt. percent obtained by the prior art, as explained before.

Returning now to the upper tray section 9 of separator 8, the gaseous phase (A) enriched by the amount of gas expelled from stream 3 and (B) and by the amount of $CO_2$ gas added to separator 8 through line 15, is withdrawn as a gaseous mixture (C) from the top of the separator 8 through line 20. The gaseous mixture (C) contains $CO_2$, $NH_3$ and water vapor. The $NH_3/CO_2$ molar ratio in the gaseous mixture (C) is from about 3.5 to about 18.

The gaseous mixture (C) is introduced through line 20 into condenser 21, provided with a cooling coil 22, through which cooling water is circulated. The gaseous mixture (C) is cooled in condenser 21 and condensed to form an aqueous ammoniacal solution of ammonium carbamate. The pressure in condenser 21 is maintained substantially at the same pressure prevailing in separator 8, and at a temperature which is above the crystallization point of carbamate, to prevent incrustation of solid carbamate on the surface of the cooling coil 22. A stream 23 may be added to condenser 21. This stream 23 can be either water, molten urea, an aqueous urea solution, an aqueous ammonia solution, an ammoniacal aqueous solution of ammonium carbamate, an ammoniacal aqueous solution of urea and ammonium carbamate, or either one or a combination of the above compounds mixed together with biuret. The addition of stream 23 to condenser 21 serves the purpose of controlling the dilution of the resultant solution formed in condenser 21 and thus of preventing the ammonium carbamate formed in condenser 21 from crystallizing from the solution. If stream 23 contains an aqueous solution of ammonium carbamate, the ratio of $H_2O$ to dissolved carbamate in stream 23 is maintained at a higher value than in stream 27 leaving condenser 21.

A stream of $CO_2$ is added to condenser 21 through line 24 for the purpose of reducing the amount of free ammonia dissolved in stream 27 by reacting a part of this free ammonia with $CO_2$ to form carbamate. It has been found that by this method the vapor pressure of the liquid phase formed in condenser 21 is greatly reduced, and that consequently condenser 21 can be operated at a relatively higher temperature, without affecting the operation of the condenser. This is quite advantageous, because the danger of crystallizing carbamate from the solution formed in condenser 21 is greatly diminished by operating the condenser 21 at a higher temperature.

According to the prior art, it has been suggested that a large excess of $CO_2$ be added to a gaseous stream of inerts containing some ammonia gas, for the purpose of reacting said ammonia with $CO_2$ to form carbonate or carbamate in an aqueous solution and thus for the purpose of scrubbing said ammonia from the gaseous stream of inerts which was vented. In such process, the solution formed contained $NH_3$ and $CO_2$ in a molar ratio which was either equal to 2:1, or it was less than 2:1 moles of ammonia per one mole of carbon dioxide due to the presence of the large excess of carbon dioxide.

It has been found that such a solution has a relatively higher vapor pressure than a solution containing $NH_3$ and $CO_2$ in the molar ratio of from about 2.1–3.6/1. In other words, a carbamate or carbonate aqueous solution with some dissolved excess ammonia has a lower vapor pressure than an aqueous solution of pure carbamate or carbonate, at the same temperature.

In the presence of a larger amount of excess ammonia dissolved in the aqueous solution of carbamate or carbonate in excess of about 3.6 moles of total ammonia per mole of total $CO_2$, the solution will again assume a greater vapor pressure, similar to the aqueous solution of pure carbonate or carbamate.

For example, without addition of $CO_2$ through line 24, at 30 p.s.i.g. the condenser 21 would have to be operated at about 130° F. in order to attain a total condensation of stream 20. The crystallization point of the solution formed by condensing stream 20 in this case would be about 121° F. This difference of about 9° F. is a temperature range too small for practical operation of condenser 21.

By adding a large excess of $CO_2$ to condenser 21 through line 24 so that the $NH_3$ to $CO_2$ molar ratio in the solution formed in the condenser 21 is equal to 2:1 or to less than 2:1, at 30 p.s.i.g. the condenser 21 would have to be operated at about 150° F. in order to attain a total condensation of stream 20. The crystallization point of the solution formed would be in this case about 140° F.

By adding $CO_2$ to condenser 21 through line 24 in such an amount as to maintain the molar ratio of $NH_3$ to $CO_2$ in the solution formed of from about 2.1–3.6/1, at 30 p.s.i.g. the condenser 21 can be operated at about 170° F. in order to condense the gaseous stream 20. The crystallization point of the solution formed in condenser 21 in this case is about 130° F. The difference of about 40° F. represents quite a wide margin of safety for the proper operation of condenser 21.

Inerts accumulated in condenser 21 are vented through valve 25 and vent line 26.

The level of liquid formed in condenser 21 is maintained substantially constant by withdrawing a stream 27 from condenser 21 through pump 28 and through valve 29.

The liquid stream 27 thus obtained can be fed to an analogous condenser, as just described on FIG. 1, but within a carbamate decomposer-condenser system operating at a higher pressure than the one described in this example.

As an alternate, the liquid stream 27 withdrawn from condenser 21 can be recycled to the reactor for recovery.

A stream of gaseous ammonia and carbon dioxide containing water, not shown, and issuing from a melamine process, can be fed either as a gas or as a liquid into the condenser 21 for recovery.

FIG. 2 illustrates the method by which excess $NH_3$ is recovered from a urea synthesis reactor effluent stream and is recycled to the urea synthesis reactor.

According to FIG. 2, a reactor effluent stream 108, in the temperature range of from about 330° F. to about 400° F., in the pressure range of from about 1500 p.s.i.g. to about 4000 p.s.i.g., and with an $NH_3$ to $CO_2$ overall molar ratio between 3–6/1, and comprising from about 25 to about 29 wt. percent urea, from about 17 to about 25 wt. percent water, from about 11 to about 25 wt. percent unconverted ammonium carbonate and from about 15 to about 43 wt. percent ammonia, is split into a minor portion stream 120 and into a major portion stream 109.

Similarly to what was described in FIG. 1, the major portion stream 109 is reduced in pressure through valve 110 and indirectly steam heated in decomposer 111 to form a decomposition product stream 112. Stream 112 contains a gaseous phase (A) comprising $NH_3$, $CO_2$ and water vapor, and a liquid phase (B) comprising residual ammonia and carbamate dissolved in an aqueous urea solution. Stream 112 is introduced into the midsection of separator 113, between the upper and the lower tray section of separator 113 and its gaseous phase (A) is separated from its liquid phase (B).

The gaseous phase (A) rises through the upper tray section and the liquid phase (B) flows downwardly through the lower tray section of separator 113.

$CO_2$ is introduced into the separator 113 and below the bottom tray of the lower tray section, through line 116 in an amount of from about 0.002 to about 0.5 pound of $CO_2$ per pound of urea present in reactor effluent line 108.

A minor portions of reactor effluent stream 108, stream 120, is reduced in pressure through valve 121, cooled, and fed through line 122 onto the top tray of the upper tray section of separator 113.

The decomposer 111, the product in line 112 and separator 113 are operated in the pressure range of from about 300 to about 650 p.s.i.g.

The first decomposer 111 and the product in line 112 are operated in the temperature range of from about 280° F. to about 345° F.

The top tray of the upper tray section of separator 113 is operated in the temperature range of from about 245° F. to about 280° F.

The bottom tray of the upper tray section and the top tray of the lower tray section of separator 113 are operated in the temperature range of from about 280° F. to about 345° F.

The bottom tray of the lower tray section of separator 113 is operated in a temperature range of from about 250° F. to about 330° F.

The mixture of the gaseous phase (A), the gaseous phase expelled from streams 120 and (B) in separator 113 and the $CO_2$ added through line 116 exits overhead from the separator 113 through line 124 in the temperature range of from about 245° F. to about 280° F., containing from about 10 to about 25 wt. percent $CO_2$ from about 65 to 85 wt. percent $NH_3$ and from about 5 to 10 wt. percent $H_2O$.

The partially degassed aqueous urea solution, containing from about 5 to about 18 wt. percent residual carbamate and from about 7 to about 25 wt. percent of residual ammonia, is withdrawn from separator 113 through line 117 and in a temperature range of from about 250° F. to about 330° F. Stream 117 is withdrawn from the first separator 113, and according to the process described in FIG. 1 above, is split into a major portion stream 125 and a minor portion stream 126.

Analogously, stream 125 is reduced in pressure through valve 127, is indirectly steam heated in second decomposer 128 to decompose carbamate and is introduced into the midsection of second separator 129.

The minor portion in line 126 is reduced in pressure through valve 130, cooled, and fed onto the top tray of the upper tray section of separator 129.

$CO_2$ is passed through line 131 into separator 129, in an amount of from about 0.002 to about 0.12 lb. per lb. of urea present in line 117.

The second decomposer 128 and the second separator 129 are operated in the pressure range of from about 100 to about 300 p.s.i.g.

The second decomposer 128 is operated in the temperature range of from about 250° F. to about 310° F.

The top tray of the upper tray section of separator 129 is operated in the temperature range of from about 200° F. to about 250° F.

The bottom tray of the upper tray section and the top tray of the lower tray section of separator 129 are operated in the temperature range of from about 250° F. to about 310° F.

The bottom tray of the lower tray section of separator 129 is operated in the temperature range of from about 220° F. to about 300° F.

A gaseous mixture of $NH_3$, $CO_2$ and water vapor is removed overhead from separator 129 through line 132. This mixture contains from about 25 to about 35 wt. percent $CO_2$, from about 45 to about 65 wt. percent $NH_3$ and from about 10 to about 20 wt. percent $H_2O$.

An aqueous urea solution, containing from about 1.5 to about 4 wt. percent residual carbamate and from about 2 to about 6 wt. percent residual ammonia, is withdrawn from the bottom section of separator 129 through line 133 in the temperature range of from about 220° F. to about 300° F.

Stream 133, according to the process described in FIG. 1 above, is split into a major portion stream 134 and into a minor portion stream 135. Still analogously, stream 134 is reduced in pressure through valve 135a, is indirectly steam heated in third decomposer 136 to decompose carbamate and is introduced into an intermediate section of third separator 137, and is separated into its gaseous phase (A) and its liquid phase (B).

$CO_2$ is introduced into the separator 137 through line 138 in an amount of from about 0.002 to about 0.15 lb. of $CO_2$ per pound of urea present in line 133.

The minor portion of stream 133 is passed through line 135, is reduced in pressure through valve 139, cooled and fed onto the top tray of the upper tray section of the third separator 137.

The third decomposer 136 and the third separator 137 are operated in the pressure range of from about 10 to about 90 p.s.i.g.

The third decomposer 136 is operated in the temperature range of from about 200° F. to about 260° F.

The top tray of the upper tray section of the third separator 137 is operated in the temperature range of from about 170° F to about 220° F.

The bottom tray of the upper section and the top tray of the lower tray section of separator 137 are operated in the temperature range of from about 200° F. to about 260° F.

The bottom tray of the lower tray section of separator 137 is operated in the temperature range of from about 180° F. to about 250° F.

A gaseous mixture of $NH_3$, $CO_2$ and water vapor is removed overhead from separator 137 through line 140 containing from about 20 to about 35 wt. percent $CO_2$, from about 25 to about 35 wt. percent $H_2O$ and from about 30 to about 55 wt. percent $NH_3$. The aqueous urea solution collected in the bottom section of separator 137, containing from about 0.5 to about 1.5 wt. percent residual carbamate and from about 0.2 to about 1.0 wt. percent residual ammonia, is withdrawn from separator 137 through line 141 in the temperature range of from about 180° F. to about 250° F.

Stream 141, still according to the process described in FIG. 1 above, is split into a major portion stream 142 and into a minor portion 143.

Stream 142 is reduced in pressure through valve 144, is indirectly steam heated in fourth decomposer 145 and is introduced into fourth separator 146, and is separated into its gaseous phase (A) and into its liquid phase (B).

$CO_2$ is introduced into the separator 146 through line 147 in an amount of from about 0.002 to about 0.08 pound of $CO_2$ per pound of urea present in line 141.

The minor portion of stream 141 is passed through line 143, is reduced in pressure through valve 148, is cooled and fed onto the top tray of the upper tray section of the fourth separator 146.

The fourth decomposer 145 and the fourth separator 146 are operated in a pressure range of from 10 p.s.i.a to about 25 p.s.i.a.

The fourth decomposed 145 is operated in the temperature range of from about 190° F. to about 260° F.

The top tray of the upper tray section of the fourth separator 146 is operated in a temperature range of from 170° F. to about 220° F.

The bottom tray of the upper tray section and the top tray of the lower tray section of separator 146 are operated in the temperature range of from about 190° F. to about 260° F.

The bottom tray of the lower tray section of separator 146 is operated in the temperature range of from about 180° F. to about 250° F.

A gaseous mixture of $NH_3$, $CO_2$ and water vapor is removed overhead from separator 146 through line 149 containing from about 4 to about 24 wt. percent $CO_2$, from about 6 to about 26 wt. percent $NH_3$ and from about 50 to 90 wt. percent $H_2O$.

The aqueous urea product solution collected in the bottom section of separator 146, containing from about 0.1 to 0.4 wt. percent residual carbamate, from about 0.01 to 0.3 wt. percent residual ammonia and about 0.1 wt. percent biuret, is removed from separator 146 through line 150 in a temperature range of from about 180° F. to about 250° F., and is sent to a subsequent unit, not shown on FIG. 2, for further processing to its solid form.

The gas mixture in line 149 is indirectly cooled by cooling water circulated through coil 151 in the fourth condenser 152 and condensed to liquid in the temperature range of from about 50° F. to about 200° F.

According to the process described in FIG. 1 above, $CO_2$ is added to condenser 152 through line 153 in an amount of from about 0.002 to about 0.1 lb. per lb. of urea in stream 141, to form carbamate with the stoichiometric amount of $NH_3$ from stream 149 and thus to lower the vapor pressure of the liquid formed in condenser 152.

The concentration of the liquid formed in condenser 152 is controlled by adding a stream of either water, an aqueous ammonia solution, or a weak ammoniacal aqueous solution of ammonium carbamate or carbonate to condenser 152 through line 154.

Urea can be added to condenser 152 through line 154, either as molten urea or as an aqueous or ammoniacal solution of urea containing biuret or as an aqueous ammoniacal solution of urea containing carbamate or carbonate and biuret.

It has been found that under certain operating conditions the addition of urea to condenser 152 or to one or more of the subsequent condensers 160, 167 and 174, has the effect of lowering the crystallization point of the carbamate dissolved in the liquid condensate formed in these respective condensers.

In prior art, the use of relatively small amounts of urea as an absorbent in the condensers in which such $NH_3$ and $CO_2$ gas mixtures were condensed, was proposed but mainly as an absorbent for $NH_3$, because it is known that urea has a certain affinity towards $NH_3$ and that it lowers the partial pressure of ammonia above the solution formed by condensation of the gaseous mixture of $NH_3$, $CO_2$ and $H_2O$. In these cases, urea was added to the condensate formed in such condensers whenever it was necessary to absorb part of the excess ammonia present in the original gaseous mixture containing $NH_3$, $CO_2$ and $H_2O$. Yet it was considered that this addition of urea to the solution formed in such a condenser adversely effects the solubility of carbamate in its aqueous solution. Namely, based on normal practice, it would appear obvious that by dissolving a solid salt into an aqueous solution which already contains another solute almost to saturation, the solute would be salted out from its original solution by the newly added salt, provided the added salt had a greater solubility than the solute originally dissolved in solution.

Contrary to this fact, it has been found that solid or liquid urea in spite of the fact that it has a greater solubility in water than carbamate, when added to a solution formed by condensing a mixture of $NH_3$, $CO_2$ and water, it actually lowers the crystallization point of carbamate present in the solution formed. This is quite advantageous because the problem of solidifying carbamate on the cooling coils in such condensers is greatly alleviated, or even practically eliminated.

According to this invention, instead of adding urea to a condenser in which a mixture of $NH_3$, $CO_2$ and water is condensed, for the purpose of absorbing part of the excess ammonia present in the condensed solution, $CO_2$ is added instead, for the purpose of tieing the major part of this excess ammonia into soluble ammonium carbamate; and urea is added to the solution for the purpose of lowering the crystallization point of carbamate present in solution.

The ultimate advantage of this method is that the condenser can be operated at a higher temperature than another equivalent condenser where only urea is added to the condenser, and that at the same time the same extent of condensation of the original mixture of $NH_3$, $CO_2$ and water is attained, in spite of the relatively higher operating temperature in the condenser.

Urea comprised in stream 154 is added to condenser 152 in an amount of from about 0.1 to about 10 pounds per one pound of $CO_2$ as ammonium carbamate comprised in stream 156 leaving the fourth condenser 152.

The fourth condenser 152 is operated at substantially the same pressure prevailing in the fourth separator 146.

Inerts accumulated in condenser 152 are vented through valve 155, or exhausted by a vacuum jet not shown.

The level of liquid in condenser 152 is maintained substantially constant by removing the liquid stream 156 through pump 157, comprising from about 5 to 20 wt. percent carbamate and from about 1 to about 10 wt. percent ammonia.

The gas mixture in line 140 from the third separator 137 is indirectly cooled by cooling water circulated through coil 159 of the third condenser 160 and condensed to liquid in the temperature range of from about 80° F. to about 210° F.

A stream of $CO_2$ is added to condenser 160 through line 161 in an amount of from about 0.004 to about 0.1 pound of $CO_2$ per pound of urea present in stream 141 of third separator 137.

A liquid stream which comprises water, ammonia, ammonium carbamate, ammonium carbonate, biuret and urea is added to condenser 160 through line 158. As indicated above, this stream can be withdrawn from condenser 152 elevated in pressure through pump 157 and injected into condenser 160 through line 158.

The amount of urea in stream 158 is maintained in the range of from about 0.1 to about 10 pounds per one pound of $CO_2$ as carbamate comprised in stream 163 leaving the third condenser 160.

The third condenser 160 is operated substantially at the same pressure prevailing in the third separator 137.

Inerts accumulated in condenser 160 are vented through valve 162.

The level of liquid in condenser 160 is maintained constant by removing the liquid stream 163 through pump 164, comprising from about 15 to 45 wt. percent carbamate and from about 1 to about 10 wt. percent ammonia.

The gas mixture in line 132 from the second separator 129 is indirectly cooled by cooling water circulated through coil 166 in the second condenser 167 and is condensed to liquid in the temperature range of from about 100° F. to about 250° F.

A stream of $CO_2$ is added to condenser 167 through line 168 in an amount of from about 0.001 to about 0.3 pound of $CO_2$ per pound of urea comprised in stream 133 leaving the second separator 129.

A liquid stream which comprises water, ammonia, ammonium carbamate or carbonate, biuret and urea, is added to condenser 167 through line 165. As indicated above, this stream can be withdrawn either from condenser 152 or from condenser 160, elevated in pressure through pump 164 and introduced into condenser 167 through line 165.

The amount of urea in stream 165 is maintained in the range of from about 0.1 to about 10 pounds per one pound of $CO_2$ as carbamate comprised in stream 170 leaving the second condenser 167.

The second condenser 167 is operated substantially at the same pressure prevailing in the second separator 129.

Inerts accumulated in condenser 167 are vented through valve 169.

The level of liquid in condenser 167 is maintained constant by removing the liquid stream 170 through pump 171, which comprises from about 40 to about 60 wt. percent carbamate and from about 5 to about 20 wt. percent ammonia.

The gas mixture in line 124 from the first separator 113 is indirectly cooled by cooling water circulated through coil 173 of the first condenser 174 and is condensed to liquid in the temperature range of from about 150° F. to about 270° F.

A stream of $CO_2$ is added to condenser 174 through line 175 in an amount of from about 0.1 to about 0.75 pound of $CO_2$ per pound of urea comprised in stream 117 leaving the first separator 113. The $CO_2$ added through line 175 reacts with the stoichiometric amount of the relatively large amount of excess ammonia present in the gaseous phase in line 124.

As mentioned above, according to prior art, part of this excess ammonia was dissolved to saturation in the liquid phase formed in the respective condenser and the remaining part of excess ammonia was separated from the saturated liquid phase, purified from $CO_2$, condensed to liquid by cooling and recycled to the reactor.

In accordance with the process of this invention, the major part of this excess ammonia is reacted to form soluble carbamate, and the carbamate formed is maintained in solution by the addition of urea to the solution. A liquid stream comprising water, ammonia, ammonium carbamate or carbonate, biuret and urea, is added to condenser 174 through line 172. This liquid stream can be withdrawn from either one of the three preceding condensers 152, 160 or 167, elevated in pressure through pump 171 and passed through line 172 into condenser 174.

The amount of urea in stream 172 is in the range of from about 0.1 to about 10 pounds per pound of $CO_2$ as carbamate comprised in stream 101 leaving the first condenser 174.

The first condenser 174 is operated substantially at the same pressure prevailing in the first separator 113.

Inerts accumulated in condenser 174 are vented through valve 176.

The level of liquid in condenser 174 is maintained constant by removing the liquid stream 101 from condenser 174.

Stream 101, comprising from about 45 to about 70 wt. percent carbamate and from about 8 to about 25 wt. percent ammonia is elevated in pressure through the carbamate pump 102, is indirectly steam heated in heater 103 and is introduced into the urea synthesis reactor 104.

A stream of liquid ammonia at about 80° F. is elevated in pressure through pump 105, is indirectly steam heated in heater 106 and is introduced into the reactor 104, in an amount which is substantially equal to the stoichiometric net amount of urea formed in reactor 104, namely the amount of urea contained in the reactor effluent stream 108 minus the amount of urea contained in the liquid stream 101 recycled to reactor 104. According to prior art, such liquid ammonia fed to a reactor operating at an overall $NH_3$ to $CO_2$ feed mol ratio between 3 and 6 to one, usually was in a molar ratio with the net amount of urea formed in the reactor higher than the overall $NH_3$ to $CO_2$ feed mol ratio in the reactor.

An additional amount of gaseous $CO_2$, in an amount up to about 0.4 pound of $CO_2$ per pound of net urea formed in reactor 104, can be compressed through $CO_2$ compressor 177 and introduced through line 178 into the reactor 104 for the purpose of utilizing the exothermic heat of carbamate formation to attain the proper operating temperature in reactor 104.

The reactor temperature also can be controlled by supplying heat to reactor 104 by means of the heating coil 107 immersed in the reactor mixture.

The reactor 104 is operated in a temperature range of from about 330° F. to about 400° F., in the pressure range of from about 1500 p.s.i.g. to about 4000 p.s.i.g., and in a total $NH_3$ to total $CO_2$ overall molar ratio of from about 3 to about 6 moles of ammonia per mole of $CO_2$.

FIG. 3 illustrates a method by which considerable heat economies are attained within the process described in FIG. 2 above.

Referring to FIGS. 2 and 3, the gaseous stream 124 leaving the first separator 113 is introduced into the economizer 179, which is provided with two separate coils 180 and 181.

A part or all of the gaseous $CO_2$ stream 175 is introduced through line 182 into economizer 179 to react with a major part of the excess ammonia present in the gaseous stream 124 and to form carbamate.

A stream comprising water, ammonia, ammonium carbamate or carbonate, urea and biuret is added to economizer 179 through line 172 for the purpose of controlling the dilution of the liquid phase formed in economizer 179 by condensation of gaseous stream 124.

The amount of urea comprised in stream 172 is in the range of between about 0.1 and about 10 pounds per pound of $CO_2$ as carbamate comprised in stream 184 leaving the economizer 179.

Stream 172 can be also withdrawn from one of the condensers 152, 160 and 167.

Part of the heat of condensation and reaction of the gaseous stream 124 is removed from economizer 179 by passing the carbamate recycle stream 101, elevated in pressure through pump 102, through coil 180, thus eliminating heater 103, and by passing the liquid ammonia reactor feed stream through pump 105 and coil 181, thus eliminating the heater 106.

The streams of carbamate recycle and liquid ammonia heated in coils 180 and 181, respectively, are introduced into the reactor 104.

The economizer 179 can be provided with a third coil, not shown on FIG. 3, through which an aqueous urea solution is passed and heated, to evaporate water from the solution and to produce either a stronger urea solution or a pure urea melt containing only traces of water. The fluid passed through said third coil can be operated in the pressure range of from about 1 p.s.i.a. to about 320 p.s.i.a. and in the temperature range of from about 120° F. to about 300° F.

A mixture of a gaseous and of a liquid phase is removed from economizer 179 through line 184, is further cooled in the first condenser 174 and totally condensed by circulating cooling water through coil 173 of the first condenser 174.

The balance of the gaseous $CO_2$ stream 175 can be added to condenser 174 through line 183.

Inerts accumulated in condenser 174 are vented through valve 176.

Economizer 179 and the first condenser 174 operate substantially at the same pressure prevailing in first separator 113. Economizer 179 operates in a temperature range of from about 260° F. to about 350° F., and the first condenser 174 operates in the temperature range of from about 150° F. to about 270° F.

FIG. 4 illustrates a method by which further heat economies are realized within the urea synthesis process described in FIG. 2.

Referring to the process of FIGS. 2 and 4, the gaseous stream 132 from the second separator 129 is introduced into the shell side 185 of the third decomposer 136. The third decomposer 136 operates under the same conditions as explained in connection with FIG. 2.

The liquid phase stream 163 from the third condenser 160 is elevated in pressure through pump 164, is passed through line 165 and a part or all of it is introduced into the shell side 185 of the third decomposer 136 through line 186, instead of passing all of said stream 165 directly to the second condenser 167.

A part or all of the gaseous $CO_2$ stream 168, originally passed completely into the second condenser 167 as explained in connection with FIG. 2, is passed through line 187 into the shell side of the third decomposer 136.

Similarly to what was explained before relative to the operation of the condenser 152, 160, 167 and 174 in regard to FIG. 2, $CO_2$ is added to the shell side 185 of the third decomposer 136 for the purpose of reacting it with the stoichiometric amount of the excess ammonia gas contained in the gaseous stream 132 containing $NH_3$, $CO_2$ and water vapor, and thus for the purpose of reducing the vapor pressure of the solution formed in the shell side 185 and of increasing the boiling point of said solution. A part or all of the liquid stream 165, containing urea as described in FIG. 2, is added to the shell side 185 of said decomposer 136 for the purpose of maintaining in solution the ammonium carbamate formed in the shell side 185. Urea in stream 186 is in an amount of from about 0.1 to about 10 pounds per pound of $CO_2$ as carbamate in stream 188 leaving the shell side 185 of the third decomposer 136.

The exothermic heat of condensation and reaction of the gaseous stream 132 is now available at a relatively higher temperature level than it would be without the addition of $CO_2$ to the shell side 185, and it is utilized to heat the product stream 134, flowing through the tube side of decomposer 136, as described in regard to FIG. 2.

The shell side of the third decomposer 136 operates at substantially the same pressure as prevails in the second separator 129, and in a temperature range of from about 220° F. to about 290° F.

A mixture of a gaseous phase containing $NH_3$, $CO_2$ and water vapor, and a liquid phase containing urea, ammonium carbamate, ammonia and water, is withdrawn from the shell side 185 of the third decomposer 136 and through line 188 and is passed into the second condenser 167 for total condensation.

The remaining portion if the gaseous stream 168 is passed through line 189 into the second condenser 167, and the remaining portion of stream 165 is passed through line 190 to condenser 167.

It is obvious that analogously to what is described above relative to FIG. 4, the gaseous stream 140 from the third separator 137 can be sent to the shell side of the fourth decomposer 145 together with part or all of the gaseous $CO_2$ stream 161 and with a part or all of stream 158, to supply the endothermic heat required to process stream 142 in the tube side of said fourth decomposer 145, instead of steam.

In this case the shell side of the fourth decomposer 145 is operated at substantially the same pressure as prevails in the third separator 137 and in the temperature range of from about 200° F. to about 270° F.

Again analogously, the mixed phase withdrawn from the shell side of the fourth decomposer 145 is mixed in the third condenser 160 with the remaining portions of streams 158 and 161, respectively, and is then condensed to a liquid phase.

Furthermore, it is obvious that analogously to what was said above relative to FIG. 4, the gaseous stream 124 from the first separator 113 can be passed into the shell side of either one of the subsequent decomposers 128, 136 and 145, together with part or all of the gaseous $CO_2$ stream 175 and with a part or all of the liquid stream 172, respectively, to support the endothermic heat required to process streams 125, 134, and 142 in their respective decomposers 128, 136 and 145. In this case, the shell sides of said decomposers operate at substantially the same pressure as prevails in the first separator 113 and in the temperature range of between about 250° F. and 350° F. The mixed phase withdrawn from the shell side of decomposers 128, 136 and 145 is mixed in the first condenser 174 with the remaining portions of streams 172 and 175, respectively, and is then condensed to a liquid phase.

It is also obvious that in the process shown in FIG. 4 either the stream 188 or the mixture of streams 132, 186 and 187 can be introduced into the shell side of the fourth decomposer 145 to supply the endothermic heat required to process stream 142, instead of steam.

FIG. 5 illustrates a method by which further heat economies can be attained with the process shown by FIG. 2.

Referring to the process of FIGS. 2 and 5, a heat recovery unit 191 is provided, for the purpose of recovering at least part of the heat of condensation and reaction of the gaseous stream 124, 132, 140 and 149 normally rejected in the cooling coils 173, 166, 159 and 151 of the first condenser 174, second condenser 167, third condenser 160 and fourth condenser 152, respectively.

Similarly to decomposers 111, 128, 136 and 145, the heat recovery unit 191 consists of a vertical shell and tube heat exchanger. It is obvious that any other type of carbamate decomposer, known to those skilled in the art, can be used instead.

The principle on which the operation of the heat recovery unit 191 is based is unique, for the reason that the heat recovery unit 191 utilizes as a heat source in its shell side the same gaseous phase (A), containing $NH_3$, $CO_2$ and water, separated in separator 192 from the liquid phase (B) from the mixed phase (C) present in line 193, formed by decomposition of stream 194 passed through the tube side of the heat recovery unit 191.

The gaseous phase (A) and stream 194 are substantially operated at the same pressure level.

According to the prior art, said gaseous phase (A) could not be condensed in indirect heat exchange with the same urea product stream 194 for the purpose of decomposing carbamate, due to the fact that no driving force was available to accomplish this.

Normally, said gaseous phase (A) could be condensed in heat exchange with another urea product solution at a much lower pressure than gaseous phase (A), for the purpose of decomposing carbamate from said urea product solution.

As an example according to prior art, a gaseous phase containing $NH_3$, $CO_2$ and water obtained from a carbamate decomposer at about 300 p.s.i.g. could be utilized to indirectly exchange heat with another stream of urea product solution at about 15 p.s.i.g. for the purpose of decomposing the carbamate from said urea product solution.

According to the prior art, a pressure differential of about 285 p.s.i. is required to provide the proper temperature differential between the condensation temperature of said condensing gaseous phase (A) and the temperature at which carbamate is thermically decomposed to $NH_3$ and $CO_2$ and driven off from said urea product solution. The above temperature differential of about 30° F. is required to provide the proper driving force for the transfer of heat from the relatively hotter condensing gas to the relatively colder urea product solution being decomposed.

According to the present invention, referring to FIG. 5, it has been found that said gaseous phase (A) can be condensed in indirect heat exchange with the same urea product solution 194 from which carbamate is decomposed to produce said gaseous phase (A), when an additional stream of $CO_2$ is added to said gaseous phase (A) in the shell side 195 of heat recovery unit 191 through line 196.

Quite similarly to what was explained in connection with the operation of condensers 152, 160, 167 and 174 of the process of FIG. 2, the function of the $CO_2$ added to the gaseous mixture (A) containing $CO_2$, $NH_3$ and $H_2O$, is to tie the major part of the excess ammonia contained in stream 197 to ammonium carbamate and thus to considerably decrease the partial pressure of the solution formed by condensation of stream 197 or conversely to considerably increase its boiling point or its condensation point.

A stream comprising urea, water, ammonia, ammonium carbamate and biuret can be added through line 198 to the shell side 195 of the heat recovery unit 191 for the purpose of maintaining the carbamate in solution.

Referring to the process of FIGS. 2 and 5, a stream of an aqueous urea solution containing ammonium carbamate and ammonia is passed through line 194 into the tube side of the heat recovery unit 191. Stream 194 can be either one of the stream 108 or 109, 117 or 125, 133 or 134, 141 or 142.

Stream 194 is heated in the tube side of the heat recovery unit 191 to produce a mixed phase 193 containing a gaseous phase (A) and a liquid phase (B). The gaseous phase (A) contains $NH_3$, $CO_2$ and water vapor, and the liquid phase contains urea, water, residual ammonium carbamate and ammonia.

The tube side of the recovery unit 191 can be operated in a wide pressure range of from about 10 p.s.i.a. to about 670 p.s.i.a. and in the corresponding temperature range of from about 180° F. to about 350° F.

The molar ratio of the total ammonia to the total $CO_2$ contained in stream 194 as ammonium carbamate and ammonia is operated in the range of from about 3 to about 15 moles of ammonia per mol of $CO_2$. Due to this relatively high $NH_3$ to $CO_2$ mole ratio in stream 194, said liquid stream 194 has a lower boiling point than the liquid condensed in the shell side 195 of the heat recovery unit 191.

The gaseous phase (A) is separated from the liquid phase (B) in separator 192. Instead of the empty vessel 192, a separator similar to separator 8, described in the process of FIG. 1, can be used. The separator 192 is operated substantially at the same pressure and temperature of the tube side of heat recovery unit 191.

The overhead gaseous phase (A) is removed through line 197 and introduced into the shell side 195 of the heat recovery unit 191. The liquid phase (B) is removed through line 202 for further processing.

The overall $NH_3$ to $CO_2$ molar ratio in the gaseous phase (A) in line 197 is operated at from about 3.5 to about 18 moles of ammonia per mole of $CO_2$.

$CO_2$ is added to the shell side 195 through line 196 in such an amount that the mixed phase withdrawn from the shell side 195 through line 199 has an overall molar ratio of the total ammonia to the total $CO_2$ contained in stream 199 as ammonium carbamate, ammonia in solution, $CO_2$ gas and $NH_3$ gas, of from about 2.1 to about 3.6 moles of ammonia per mole of $CO_2$.

It has been found that due to this relatively low $NH_3$ to $CO_2$ mole ratio the liquid formed in the shell side 195 has a higher boiling point than stream 194.

A stream comprising urea, water, ammonia, ammonium carbamate and biuret can be added through line 198. The amount of urea in stream 198 is in the range of from about 0.1 to about 10 pounds per pound of total $CO_2$ present in stream 199.

The shell side 195 of the heat recovery unit 191 can be operated in a pressure range of from about 10 p.s.i.a. to about 670 p.s.i.a. and in the temperature range of from about 200° F. to about 350° F.

Stream 199 can be totally condensed in a condenser 200 or in one of the respective condensers 174, 167, 160 and 152, when streams 108 or 109, 117 or 125, 133 or 134 and 141 or 142, respectively, are used instead of stream 194.

The condensed solution can be utilized in one of the manners described in connection with FIG. 2.

The invention is illustrated by the following example, with reference being made to FIGS. 1 and 2.

11,136 parts of an ammoniacal aqueous solution of ammonium carbamate and urea is withdrawn from the first condenser 174 at 240° F. and 650 p.s.i.g. through line 101 and is pumped by means of the high pressure carbamate pump 102 through the carbamate heater 103, heated with steam to about 330° F. and is introduced into the urea synthesis reactor 104 which is operated at about 3200 p.s.i.g.

The overall composition of the carbamate solution in line 101 is as follows:

| | Wt. percent |
|---|---|
| $CO_2$ | 34 |
| $NH_3$ | 45 |
| $H_2O$ | 14 |
| Urea | 7 |
| Total | 100 |

1950 parts of liquid $NH_3$ at about 60° F. and 200 p.s.i.g. is pumped by means of the liquid ammonia pump 105 to about 3200 p.s.i.g. and heated with steam in heater 106 to about 330° F. and is introduced into the reactor 4. The temperature in reactor 4 is maintained constant at about 375° F. by means of the steam heated coil 107 immersed into the reactor mixture therein.

The reactor effluent stream, equal to 13,086 parts is withdrawn through line 108. It has the following composition:

| | Wt. percent |
|---|---|
| Urea | 32 |
| Ammonium carbamate | 18 |
| $NH_3$ | 30 |
| Water | 20 |
| Total | 100 |

About 90% of this stream is passed through line 109 and is let down in pressure to about 650 p.s.i.g. through valve 110. It is then introduced into the bottom of the tube side of the first decomposer 111, and heated up to about 340° F. by supplying steam to the shell side of the first decomposer 111.

Part of the ammonium carbamate originally contained in line 109 is decomposed to $NH_3$ and $CO_2$ and stripped from the urea solution together with part of the free ammonia dissolved in solution and part of the liquid water which is vaporized. The resulting liquid-gas mixture flows through line 112 and is introduced into an intermediate part of the first separator 113 and onto the top tray of the lower tray section therein.

The liquid phase separates from the gaseous phase on the top tray and flows downwardly and countercurrently to 100 parts of gaseous $CO_2$ fed at about 300° F. through line 116 into the first separator 113 and underneath the bottom tray of the lower tray section therein.

8826 parts of liquid phase is withdrawn from first separator 113 through line 117. It has the following composition:

| | Wt. percent |
|---|---|
| Urea | 47 |
| Ammonium carbamate | 14 |
| $NH_3$ | 13 |
| $H_2O$ | 26 |
| Total | 100 |

The gas leaving the upper tray of the lower tray section and entering the bottom tray of the upper tray section flows upwards and countercurrently to a stream 122 of urea product solution, withdrawn from line 108 through line 120 and valve 121 in an amount which is approximately 10% of the total stream in line 108.

The urea product solution from line 120 and through valve 121 is fed through line 122 into the first separator 113 and onto the top tray of the upper tray section therein.

The gaseous phase leaving the top of separator 113 through line 124 at about 320° F. and 650 p.s.i.g. has the following composition:

| | Wt. percent |
|---|---|
| $CO_2$ | 17 |
| $NH_3$ | 75 |
| $H_2O$ | 8 |
| Total | 100 |

About 90% of stream 117 from the first separator 113 is withdrawn through line 125 and let down in pressure to about 150 p.s.i.g. through valve 127 and is fed into the bottom of the steam heated second decomposer 128, which operates at about 280° F., and thence to the second seperator 129.

About 10% of stream 117 is withdrawn through line 126, reduced in pressure through valve 130 and fed to the top tray of separator 129.

About 100 parts of gaseous $CO_2$ at about 280° F. is introduced into separator 129 through line 131 and underneath the bottom tray of separator 129.

6643 parts of liquid phase is withdrawn from second separator 129 through line 133 at the following composition:

| | Wt. percent |
|---|---|
| Urea | 64 |
| Ammonium carbamate | 3 |
| Ammonia | 5 |
| Water | 28 |
| Total | 100 |

The gaseous phase leaving the top of second separator 129 through line 132 at about 150 p.s.i.g. and 260° F., has the following composition:

| | Wt. percent |
|---|---|
| $CO_2$ | 28 |
| $NH_3$ | 55 |
| $H_2O$ | 17 |
| Total | 100 |

About 90% of stream 133 from second separator 129 is withdrawn through line 134 and let down in pressure through valve 135a to about 30 p.s.i.g., fed into the bottom of the vertical fourth decomposer 145, steam heated to about 240° F. and introduced into an intermediate section of the third separator 137. About 10% of stream 133 from second separator 129 is passed through line 135, reduced in pressure through valve 139 into the third separator 137 and onto its top tray. 124 parts of gaseous $CO_2$ at about 240° F. is fed through line 138 into the third separator 137 and underneath its bottom tray.

5977 parts of liquid phase is withdrawn from third separator 137 through line 141 with the following composition:

| | Wt. percent |
|---|---|
| Urea | 70.3 |
| Ammonium carbamate | 1.3 |
| Ammonia | 0.7 |
| Water | 27.7 |
| Total | 100.0 |

The gaseous phase leaving the top of the third separator 137 through line 140 at about 30 p.s.i.g. and about 230° F. has the following composition:

| | Wt. percent |
|---|---|
| $CO_2$ | 27 |
| $NH_3$ | 44 |
| $H_2O$ | 29 |
| Total | 100 |

About 90% of stream 141 from third separator 137 is withdrawn through line 142 and let down in pressure through valve 144 to about 2 p.si.g., fed into the bottom of the vertical fourth decomposer 145, steam heated to about 245° F. and introduced into an intermediate section of fourth separator 146.

About 10% of stream 141 from third separator 137 is passed through line 143, reduced in pressure through valve 148 and fed into the fourth separator 146 and onto its top tray.

21 parts of gaseous $CO_2$ at about 240° F. is fed through line 147 into fourth separator 146 and underneath its bottom tray.

5486 parts of liquid phase, containing some biuret formed as a by-product from urea, is withdrawn from fourth separator 146 through line 150 at the following composition:

| | Wt. percent |
|---|---|
| Urea | 76.6 |
| Ammonium carbamate | 0.3 |
| Ammonia | 0.1 |
| Water | 23.0 |
| Total | 100.0 |

The urea product solution in line 150 can be used for further processing to solid urea by any well-known technique available.

The gaseous phase leaving the top of fourth separator 146 through line 149 at about 2 p.s.i.g. and about 240° F. has the following composition:

| | Wt. percent |
|---|---|
| $CO_2$ | 11 |
| $NH_3$ | 13 |
| $H_2O$ | 76 |
| Total | 100 |

This is introduced into the water cooled fourth condenser 152, cooled to about 150° F. and condensed at about 2 p.s.i.g. 20 parts of $CO_2$ is passed through line 153 into condenser 152. 1019 parts of urea product solution is withdrawn from stream 150 and is recycled into the fourth condenser 152 through line 154.

The purpose of the urea solution recycle stream 154 is to decrease the crystallization point of the ammoniacal aqueous solution of ammonium carbamate formed in fourth condenser 152.

The urea recycle stream 154 can be in the form either of a urea melt, or of an aqueous urea solution, or of an aqueous urea solution containing ammonium carbamate or carbonate, ammonia, biuret, cyanic acid, cyanuric acid, etc.

Inerts, mainly consisting of $H_2$ and $CH_4$ are purged from fourth condenser 152 through valve 155.

The liquid formed in fourth condenser 152, consisting of an aqueous urea solution containing carbamate and ammonia, with the following overall composition:

| | Wt. percent |
|---|---|
| $CO_2$ | 5 |
| $NH_3$ | 4 |
| $H_2O$ | 40 |
| Urea | 51 |
| Total | 100 | is passed through line 156, elevated in pressure through pump 157 and passed through line 158 into the third condenser 160, operating at about 30 p.s.i.g. 120 parts of $CO_2$ is added to condenser 160 through line 161.

The gas leaving the top of third separator 137 through line 140 is also introduced into the water cooled third condenser 160, cooled to about 180° F. and condensed to a solution, which mixed with the solution of stream 158 and reacted with stream 161, acquires the following overall composition:

| | Wt. percent |
|---|---|
| $CO_2$ | 16 |
| $NH_3$ | 17 |
| $H_2O$ | 35 |
| Urea | 32 |
| Total | 100 |

Inerts are purged from third condenser 160 through valve 162.

The solution stream 163 from third condenser 160 is elevated in pressure by means of pump 164 and passed through line 165 into the second condenser 167, which operates at about 150 p.s.i.g. 300 parts of $CO_2$ is added to condenser 167 through line 168.

The gas leaving the top of second separator 129 through line 132 is also introduced into the water cooled second condenser 167, is cooled to about 185° F. and condensed to a solution, which mixed with the solution of stream 165 and reacted with stream 168, acquires the following overall composition:

| | Wt. percent |
|---|---|
| $CO_2$ | 27 |
| $NH_3$ | 33 |
| $H_2O$ | 25 |
| Urea | 15 |
| Total | 100 |

Inerts are purged from second condenser 167 through valve 169.

The solution stream 170 from second condenser 167 is pumped by means of pump 171 and through line 172 into the water cooled first condenser 174, which operates at about 650 p.s.i.g.

The gas leaving the top of first separator 13 through line 124 is also introduced into first condenser 174, together with 1732 parts of gaseous $CO_2$ passed through line 175.

Either part or all of this stream 175 can be introduced directly into the reactor 104 by compression to 3200 p.s.i.g. through $CO_2$ compressor 177 and through line 178 shown in FIG. 2, but with the following and obvious disadvantages:

(1) The electrical power consumption would increase considerably due to the gas compression work done in the $CO_2$ compressor 177.

(2) The solution formed in first condenser 174 without the addition of stream 175 containing gaseous $CO_2$ could not hold in solution all of the excess free ammonia present, and thus either a relatively expensive excess free ammonia recovery system would have to be installed in conjunction with first condenser 174 at an obvious economical disadvantage, or the reactor would have to be operated at a lower $NH_3$ to $CO_2$ molar ratio, with a consequent lower conversion.

The mixture of stream 124, 172 and 175 is cooled to about 240° F. to form 11,136 parts of solution of the following overall composition:

| | Wt. percent |
|---|---|
| $CO_2$ | 34 |
| $NH_3$ | 45 |
| $H_2O$ | 14 |
| Urea | 7 |
| Total | 100 |

It is passed through line 101, elevated in pressure by means of the carbamate pump 102 to 3200 p.s.i.g. and recycled into the reactor 104 through the steam heated carbamate heater 103, as explained above.

Inerts are purged from first condenser 174 through valve 176.

What is claimed is:

1. In a urea synthesis process wherein a first aqueous urea solution containing ammonium carbamate and ammonia in an overall $NH_3$ to $CO_2$ molar ratio of from about 3 to about 15 molar proportions of $NH_3$ as ammonium carbamate and as dissolved $NH_3$ to one molar proportion of $CO_2$ as ammonium carbamate is employed, the improvement which comprises:

(a) splitting said first aqueous urea solution into a minor portion (A) and into a major portion (B) thereof, (b) cooling said minor portion (A).

(c) heating said major portion (B) in a carbamate decomposer to a temperature above the decomposition temperature of ammonium carbamate and at a pressure of from about 10 p.s.i.a. to about 670 p.s.i.a., to decompose the carbamate to $NH_3$ and $CO_2$ gases, to vaporize part of the excess $NH_3$ and part of the water present in said major portion (B), and to expel the resulting gaseous phase (C) from the residual liquid phase (D), phase (D) comprising residual ammonium carbamate and ammonia dissolved in a second aqueous urea solution, (d) contacting said gaseous phase (C) countercurrently with said cooled minor portion (A), the temperature of said contact being at or above the decomposition temperature of ammonium carbamate and at a pressure of from about 10 p.s.i.a. to about 670 p.s.i.a., and (e) contacting said liquid phase (D) adiabatically and countercurrently with gaseous $CO_2$ at a pressure of from about 10 p.s.i.a. to about 670 p.s.i.a., the amount of gaseous $CO_2$ being from about 0.002 to about 0.5 part by weight per part by weight of urea present in said first aqueous urea solution, the gaseous $CO_2$ stripping $NH_3$ from said liquid phase (D) and cooling said phase (D).

2. The process of claim 1, wherein the minor portion (A) in (a) comprises from about 10 to about 30 percent by weight of said first aqueous urea solution and said major portion (B) thereof comprises from about 90 to about 70 percent by weight.

3. The process of claim 1, wherein the temperature of (c) is from about 190° F. to about 350° F.

4. The process of claim 1, wherein the temperature of (d) is from about 180° F. to about 350° F.

5. The process of claim 1, wherein the temperature of the countercurrent contact of (e) is from about 180° F. to about 350° F.

6. The process for forming urea by reaction of ammonia and carbon dioxide, comprising:

(a) contacting ammonia and carbon dioxide to form a first aqueous urea solution containing ammonium carbamate and ammonia, in an overall $NH_3$ to $CO_2$ molar ratio of from about 3 to about 15 molar proportions of ammonia as ammonium carbamate and as dissolved $NH_3$ to one molar proportion of $CO_2$ as ammonium carbamate, (b) splitting said first aqueous urea solution into a minor portion (A) and into a major portion (B) thereof, (c) cooling said minor portion (A), (d) heating said major portion (B) in a carbamate decomposer to a temperature above the decomposition temperature of ammonium carbamate and at a pressure of from about 10 p.s.i.a. to about 670 p.s.i.a., to decompose the carbamate to $NH_3$ and $CO_2$ gases, to vaporize part of the excess $NH_3$ and part of the water present in said major portion (B), and to expel the resulting gaseous phase (C) from the residual liquid phase (D), phase (D) comprising residual ammonium carbamate and ammonia dissolved in a second aqueous urea solution.

(e) passing said gaseous phase (C) and said liquid phase (D) into an intermediate section of a separator wherein said phases (C) and (D) are separated, said intermediate section being operated at a temperature approximately equal to the temperaure and pressure recited in (d), (f) passing into a lower section of said separator gaseous $CO_2$ countercurrently to downwardly flowing liquid phase (D), said countercurrent contact of said liquid phase (D) and said gaseous $CO_2$ being conducted adiabatically and at a temperature of from about 180° F. to about 330° F., the gaseous $CO_2$ stripping $NH_3$ from said liquid phase (D) and cooling said phase (D), (g) passing into an upper section of said separator said minor portion (A) at a lower temperature than said gaseous phase (C) countercurrently to upwardly flowing gaseous phase (C) and said gaseous $CO_2$, the portion of said upper section receiving said minor portion (A) being operated at a temperature of from about 170° F. to about 280° F., said upwardly flowing $CO_2$ being enriched with ammonia stripped from liquid phase (D) and is mixed with said phase (C) and the resulting mixture rising upwardly through said separator countercurrently to said downwardly flowing minor portion (A), said relatively hotter resulting mixture being cooled and said relatively colder minor portion (A) being heated above the decomposition temperature of ammonium carbamate at a pressure of from about 10 p.s.i.a. to about 670 p.s.i.a., and at least part of the ammonium carbamate present in said minor portion (A) being decomposed to gas and being expelled from said minor portion (A) together with ammonia therein, wherein said intermediate section is operated at a temperature which is greater than the temperature of said upper section of said separator receiving said minor portion (A), and greater than the temperature of said lower section of said separator receiving said gaseous $CO_2$, and said lower section of said separator being operated at a temperature greater than the temperature of said upper section of said separator, and wherein said upper, said intermediate and said lower sections of said separator are operated in a pressure range from about 10 p.s.i.a. to about 670 p.s.i.a.

References Cited
UNITED STATES PATENTS 3,579,636   5/1971   Mavrovic _____ 260—555
3,406,201   10/1968  Baumann et al. _____ 260—555

LEON ZITVER, Primary Examiner

A. SIEGEL, Assistant Examiner

UNITED STATES PATENT OFFICE
CERTIFICATE OF CORRECTION

Patent No. 3,808,271   Dated April 30, 1974

Inventor(s) IVO MAVROVIC

It is certified that error appears in the above-identified patent and that said Letters Patent are hereby corrected as shown below:

Column 3, line 18: replace "minor portion (B)" with -- major portion (B) --.

Column 3, line 21: replace "amomnium" with ---ammonium---.

Column 5, line 16: replace "its" with ---it---.

Column 7, line 47: replace "portions" with ---portion---.

Column 8, line 6: replace "wtihdrawn" with ---withdrawn---.

Column 17, line 40: replace "seperator" with ---separator---.

Column 17, line 68: replace "fourth decomposer 145" with ---third decomposer 136---.

Signed and sealed this 28th day of January 1975.

(SEAL)
Attest:

McCOY M. GIBSON JR.
Attesting Officer

C. MARSHALL DANN
Commissioner of Patents